Feb. 17, 1970   J. B. ULAM ETAL   3,495,735
NON-STICK UTENSILS
Filed Aug. 4, 1965

INVENTORS
John B. Ulam & William C. Camp

United States Patent Office 3,495,735
Patented Feb. 17, 1970

3,495,735
NON-STICK UTENSILS
John B. Ulam and William C. Camp, Canonsburg, Pa., assignors, by mesne assignments, to Composite Metal Products, Inc., a corporation of Delaware
Filed Aug. 4, 1965, Ser. No. 477,275
Int. Cl. B65d 25/14
U.S. Cl. 220—64                                     1 Claim

ABSTRACT OF THE DISCLOSURE

A stainless non-stick cooking utensil is provided having a layer of non-stick plastic material on the inner food-contacting surface thereof, said cooking utensil having a multi-component composite wall structure comprising an outer layer of stainless steel, an intermediate layer of aluminum bonded on one side to the inner surface of said outer layer of stainless steel, an inner layer of stainless steel bonded to the other side of said intermediate layer of aluminum, the layer of non-stick plastic material bonded to the exposed surface of the inner layer of stainless steel.

---

This invention relates to non-stick utensils and particularly to cooking utensils of composite metal structure having a coating of a non-stick material on the cooking surface thereof.

The development of frying pans and other cooking utensils having a coating of a non-stick plastic material on the inner food-contacting surface thereof has met with wide popular acceptance. The coating materials most commonly employed are tetrafluoroethylene and similar fluorocarbon resins, and these materials usually and most successfully have been applied to utensils made of aluminum and aluminum alloys. Attempts made heretofore to apply these non-stick materials to other metals from which cooking utensils are ordinarily fabricated, and in particular utensils formed of stainless steel, have not met with much success.

Cooking utensils formed from stainless steel have many important advantages over utensils formed of other metals, notably the freedom of stainless utensils from staining and discoloration and the relative ease with which they may be cleaned. However, stainless steel is a poor conductor of heat, and this can be a serious disadvantage especially when used for skillets and other utensils exposed to concentrated high temperatures.

We have now developed a new cooking utensil construction which retains the essential advantages of stainless steel, namely, its cleanliness and freedom from discoloration, and at the same time overcomes or counteracts the poor heat conductivity of stainless steel and permits the ready application of a non-stick coating to the inside surface thereof. Our new utensil is provided with a multi-component composite wall structure, the outermost component of which is a layer of stainless steel, an intermediate component of which is a layer of aluminum advantageously metallurgically bonded to the inner surface of the layer of stainless steel, and the innermost component of which is a coating of a non-stick plastic material such as tetrafluoroethylene adhesively bonded to the inner surface of the layer of aluminum. Preferably, the composite is a tri-component composite having a stainless steel outer surface, an intermediate layer of aluminum and an inner or cooking surface of tetrafluoroethylene.

Figure 1:
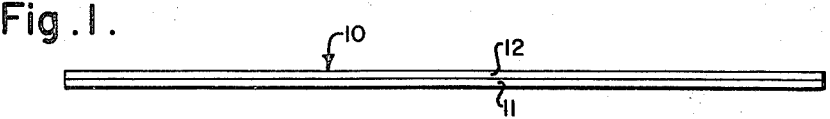
Figure 2:
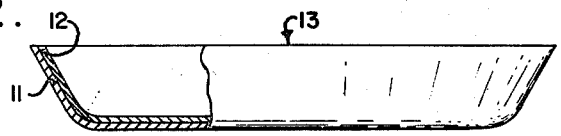
Figure 3:
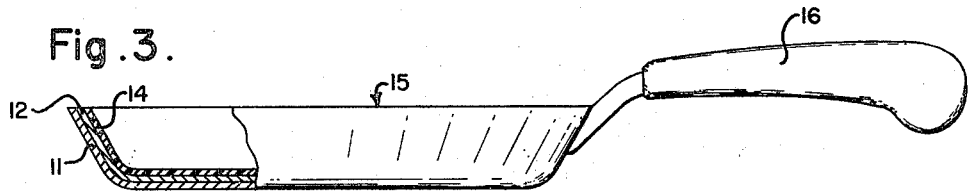
Figure 4:
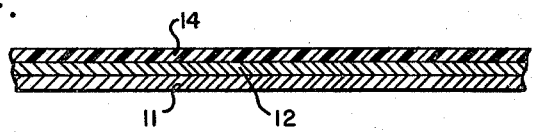

The composite structure of our non-stick stainless steel cooking utensil, and the preferred method of its manufacture, will be better understood from the following description thereof in conjunction with the accompanying drawings of which, FIGURE 1 is a side elevation of a bi-metallic blank from which the utensil is initially formed;
FIGURE 2 is a side elevation partly in section of the utensil after the initial forming operation;
FIGURE 3 is a side elevation partly in section of the utensil with the non-stick inner lining applied thereto;
FIGURE 4 is an enlarged fragmentary sectional view showing the tri-component composite structure of my new cooking utensil; and
FIGURE 5 is a side elevation partly in section of a second embodiment of utensil using a tri-metal composite with the non-stick inner lining applied thereto.

In the preferred method of making our non-stick cooking utensil, a flat bi-metallic blank 10 is prepared by bonding a layer 11 of stainless steel to an adjoining layer 12 of aluminum, the shape or contour of the blank corresponding to the shape (i.e., circular, oval or rectangular) of the utensil to be formed therefrom. The layer of aluminum is preferably metallurgically bonded to the layer of stainless steel, advantageously by first rolling the two metal layers of the blank together to obtain what is essentially a mechanical or adhesive bond followed by treatment of the blank to develop a metallurgical bond between the metal layers.

The flat bi-metallic blank is shaped or formed to obtain the desired bowl or pan-shaped utensil, for example, the frying pan or skillet 13 shown in FIG. 2, preferably by a drawing operation carried out with conventional deep drawing equipment. A coating 14 of a non-stick plastic material such as tetrafluoroethylene or a similar fluorocarbon resin is then applied to the inner surface of the aluminum layer 12 in the manner well known in the art to obtain the tri-component composite structure 15 shown in FIGURE 3. A handle 16 completes the utensil. As shown best in FIGURE 4, the tri-component composite wall structure of our new utensil comprises an outer layer 11 of stainless steel, an intermediate layer 12 of aluminum bonded to the inner surface of the layer 11, and an inner coating 14 of a non-stick plastic material bonded to the inner surface of the layer 12. The bond between the stainless steel layer 11 and the aluminum layer 12 is advantageously metallurgical in character, and the bond between the aluminum layer 12 and the non-stick coating 14 is essentially mechanical or adhesive in character, the latter bond being obtained by spray-coating and fusing a layer of the non-stick material onto the prepared surface of the aluminum layer.

Figure 5:
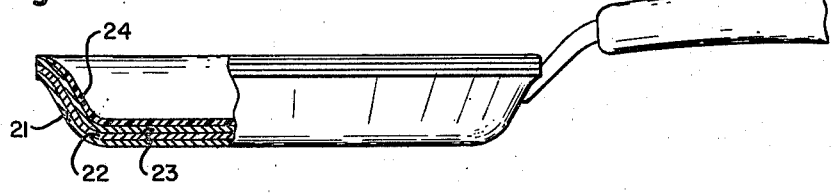

In FIGURE 5, we have illustrated a multi-layer composite made up of an outer layer of stainless steel 21, an intermediate layer of aluminum 22, an inner layer of stainless steel 23 and a cooking surface 24 of tetrafluoroethylene applied to the inner layer 23 of stainless steel.

The composite cooking utensil of our invention presents the appearance of being simply a stainless steel vessel having a non-stick plastic coating on the food-contacting surface thereof, and our utensil possesses all of the many advantages of such a combination. However, the presence of an intermediate layer of aluminum between the outer layer of stainless steel and the inner layer of non-stick plastic results in a significant improvement in the heat conductivity of the utensil walls with the resulting elimination of localized hot spots when the utensil is in use.

From the foregoing description of our new cooking utensil having a unique multi-component composite wall structure it will be seen that we have made an important contribution to the art to which our invention relates.

We claim:
1. A stainless, non-stick cooking utensil having a layer of non-stick plastic material on the inner food-contacting surface thereof, said cooking utensil having a multi-com- ponent composite wall structure comprising an outer layer of stainless steel, an intermediate layer of aluminum bonded on one side to the inner surface of said outer layer of stainless steel, an inner layer of stainless steel bonded to the other side of said intermediate layer of aluminum and a layer of non-stick plastic material bonded to the exposed surface of the inner layer of stainless steel.

References Cited

UNITED STATES PATENTS 3,143,241   8/1964   Howell _____ 220—64

JOSEPH R. LECLAIR, Primary Examiner

JOHN M. CASKIE, Assistant Examiner